United States Patent [19]

Heninger

[11] Patent Number: 6,029,207
[45] Date of Patent: Feb. 22, 2000

[54] APPARATUS AND METHOD FOR DYNAMIC LINKING OF COMPUTER SOFTWARE COMPONENTS

[75] Inventor: Andrew G. Heninger, Santa Clara, Calif.

[73] Assignee: Apple Computer, Inc., Cupertino, Calif.

[21] Appl. No.: 08/914,834

[22] Filed: Aug. 19, 1997

Related U.S. Application Data

[63] Continuation of application No. 07/985,449, Dec. 3, 1992, Pat. No. 5,659,751, which is a continuation of application No. 07/461,386, Jan. 5, 1990, abandoned.

[51] Int. Cl.[7] ............................................. G06F 9/45
[52] U.S. Cl. ........................ 709/305; 709/303; 395/710
[58] Field of Search ................................. 709/305, 303; 395/710

[56] References Cited

U.S. PATENT DOCUMENTS

| | | | |
|---|---|---|---|
| 4,325,120 | 4/1982 | Colley et al. . | |
| 4,525,780 | 6/1985 | Bratt et al. | 711/163 |
| 4,587,628 | 5/1986 | Archer et al. | 709/302 |
| 4,656,579 | 4/1987 | Bachman et al. | 711/147 |
| 4,670,839 | 6/1987 | Pilat et al. | 711/119 |
| 4,734,854 | 3/1988 | Afshar | 395/703 |
| 5,095,522 | 3/1992 | Fujita et al. | 709/303 |
| 5,129,086 | 7/1992 | Coyle, Jr. et al. | 709/302 |
| 5,136,709 | 8/1992 | Shirakabe et al. | 395/710 |
| 5,175,828 | 12/1992 | Hall et al. | 709/305 |
| 5,206,951 | 4/1993 | Khoyi et al. | 709/303 |

*Primary Examiner*—Lucien U. Toplu
*Attorney, Agent, or Firm*—Blakely, Sokoloff, Taylor & Zafman

[57] ABSTRACT

An apparatus and method for the dynamic (execution time) linking of object oriented software components is disclosed. The present invention comprises a computer system including a set of at least two software components. This invention provides a method and means for dynamically linking object oriented software components during run time execution of the program. The present invention includes two main features. First, a query function is provided to allow an application component to determine, during program execution time, the name and location of library classes available for use. Second, the application component can create (instantiate) instances of derived classes of an abstract base class. The application component can manipulate the instantiated object using the abstract interface provided by the base class definition. The implementation of the present invention involves processing at two steps in the software generation cycle. First, the prior art static linker must be modified to provide processing support for the present invention at link time. Second, the main features of the present invention are performed at program execution time.

16 Claims, 7 Drawing Sheets

Figure 4
Present Invention Method for Static Linking

Figure 5

Querying Libraries for a Derived Class

Figure 6

Creating an Object of Desired Class

APPARATUS AND METHOD FOR DYNAMIC LINKING OF COMPUTER SOFTWARE COMPONENTS

This is a continuation of application Ser. No. 07/985,449 filed Dec. 3, 1992, now U.S. Pat. No. 5,659,751, which is a continuation application Ser. No. 07/461,386 filed Jan. 5, 1990, which is Abandoned.

BACKGROUND OF THE INVENTION (1) Field of the Invention

This invention relates to an apparatus and method for the dynamic linking of computer software components. Specifically, the field of this invention is that of computer systems where the controlling program logic is divisible into at least two components. One of the software components must provide at least one function or data item accessible by a different software component.

(2) Prior Art

Computer systems, including both hardware and software components, are rapidly becoming more powerful and sophisticated. One reason for the rapid expansion is a system architecture whereby the components of the computer system are designed and built in a modular fashion. As long as the interface between components is established, each modular component can be constructed, modified, and tested independently. Modularity leads to better computer products at minimal cost.

Figure 2:
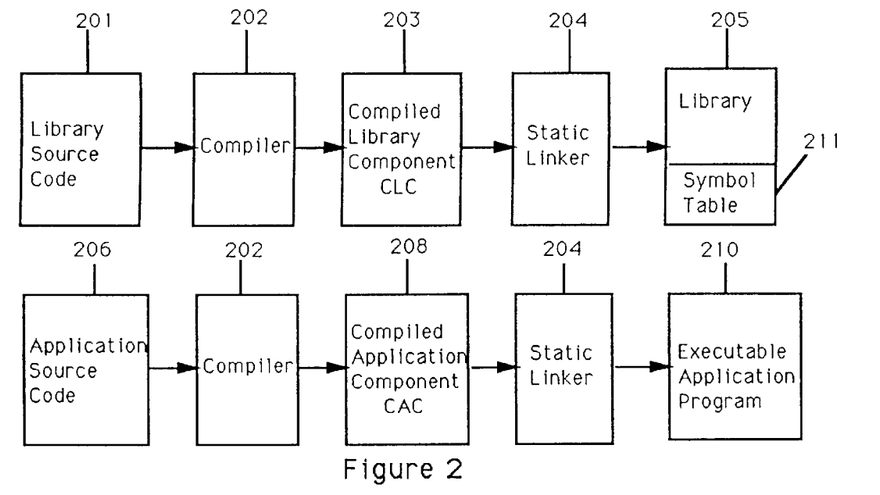
FIG. 2 is an illustration of the prior art static linking process for libraries and application programs.

Computer software developers are realizing the advantages of using modular concepts in the design of computer program logic. Engineers are designing logic systems as groups of separate software components (modules), each of which perform specialized tasks. Each component is designed to be as independent and abstract as possible from the other modules. Components are typically designed to be separately compilable. The compiler translates the high level programming language into a processor readable form. The compilation process is well known computer software technique. This process is shown in FIG. 2. The compiled components are bound together into a cohesive operable system (executable) using a static linker. The static linker resolves all of the inter-component accesses and produces a complete executable system.

Software built in modular fashion is more portable to other hardware platforms, more compatible with other software and hardware interfaces, and more easily designed, generated, tested, installed, and maintained. Clearly, complete component independence is not desirable or practical; software components need to be able to communicate with each other for access to information and system resources. Software component interfaces (SCI) are provided in each component for this purpose. The benefits of modularity accrue more rapidly, however, when the SCI is small and the component interfaces are abstracted to the greatest degree possible.

For example, a computer software system might be designed in two components. The first software component provides functions callable by the second software component for the purpose of displaying a circle or a rectangle on the display screen. In this sample software system, the set of functions provided by the first software component represent the SCI. In a less modular implementation of the SCI in this example, separate functions may be provided for displaying the circle, the rectangle, or any other shapes that may be displayable. The second software component is required to explicitly access the appropriate function for displaying the desired shape. This is the typical implementation existing in the art prior to the present invention. This implementation, however fails to fully exploit the advantages of modular software design. If a new shape (e.g. triangle) is required by the second software component, the first software component will have to be modified and regenerated (recompiled and relinked) in order to take advantage of the new function available for displaying triangles. Regeneration of the first software component is often not possible since the source code is not available. Similarly, changes to the calling parameters for any of the SCI functions may force the modification and regeneration of other software components. Undetected runtime parameter mismatches in an improperly configured SCI may cause unpredictable or destructive results.

Modular software design has advanced in the prior art through the use of object-oriented programming. Object-oriented programming allows the software designer to associate a packet of information with a set of functions (methods) for manipulating the information. The information packet with its associated functions is collectively called an object. By accessing a particular object, the programmer gains implicit access to the object's associated functions. Separate interfaces do not need to be explicitly defined.

In an object-oriented system, an object is a software entity representing information and the methods available for manipulating a collection of information. For example, an object called SQUARE may be defined in an object-oriented system. The object represents both information and methods associated with a square. The information retained for the object may include the name or identity of the square, location of the four vertices of the square, the length of the sides, the color of the square, the type of lines (dashed or solid) used to draw the square, etc. Many other parameters or items of information may be necessary or desirable for representing a square in a particular computer system. The methods associated with the object SQUARE may include a function for displaying the square, moving the square, resizing, and removing the square from the display. Many other methods or functions may be appropriate for easily manipulating the square. Each of the functions and items of information for the square are collectively bundled under the object definition (SQUARE).

Object-oriented systems make a distinction between the description of an object and the object itself. More than one similar object may be described by the same general description; thus, in the above example, many squares could be defined with the same object description for SQUARE. The object description is called a class, since the description can be used to describe a type or class of similar objects. An object oriented programming language using objects and classes is described in the book C++ Primer, written by Stanley B. Lippman, Addison Wesley, 1989. Each individual object described by a class is called an instance of that class. The same methods defined for a class can be used to manipulate more than one instance.

Data Abstraction

Two key features of object oriented systems are data abstraction and inheritance. Data abstraction is a concept whereby the information or data packet associated with an object is not directly accessible by other software components. Object data is only accessible through use of the methods provided by the object.

Inheritance

Inheritance allows the declaration of new object classes based upon a previously defined class. Thus, a previously declared base object class can be altered or extended to produce a new derived object class. Derived objects inherit the methods and data of the base object without the need for explicit declaration. Complex object hierarchies can thus be created from relatively simple explicit declarations.

In the above example, a base class called SHAPE could be defined. The SHAPE class could include information and methods for manipulating any arbitrary shape; thus, this class has the desirable trait of a greater degree of data abstraction. Information retained for SHAPE could include color of the shape, location of the shape, and the type of lines used to draw the shape (dashed or solid), etc. The SHAPE methods could include drawing the shape, moving the shape, resizing the shape, and removing the shape from the display. If the SHAPE class is defined in this manner, a CIRCLE class could be defined as a class derived from the abstract base class SHAPE. The class definition may be implemented in the following form:

CIRCLE: SHAPE

The CIRCLE class would inherit all of the information and methods defined for SHAPE. The CIRCLE class would need to be augmented only for the information and methods of particular significance to the derived class, such as radius of the circle. The SQUARE class defined above could also be redefined as a derived class based on the SHAPE base class.

Data Type Checking

Greater software reliability is achieved by employing object-oriented programming techniques and by employing two other features that may or may not be included in a particular software environment: strong data/parameter type checking, and overloading. Type checking is a feature for assuring that appropriate operations are performed on compatible data items. During compile time, the compiler will generate an error if an attempt is made to access an undefined object method or an attempt is made to use an incorrect argument list. In a strongly typed object oriented language, such as C++ or Object Pascal, objects are identified using references or pointers that name one of the base types from which the object inherited an interface. Only the functions that are defined in the interface may be invoked. In these strongly typed environments, there is a sharp distinction between the development tools (compiler and static linker) for the programming environment and the executable application software that is generated. In order to incorporate new object or data types into these strongly typed languages, the existing software must be recompiled and relinked.

Overloading

Figure 3:
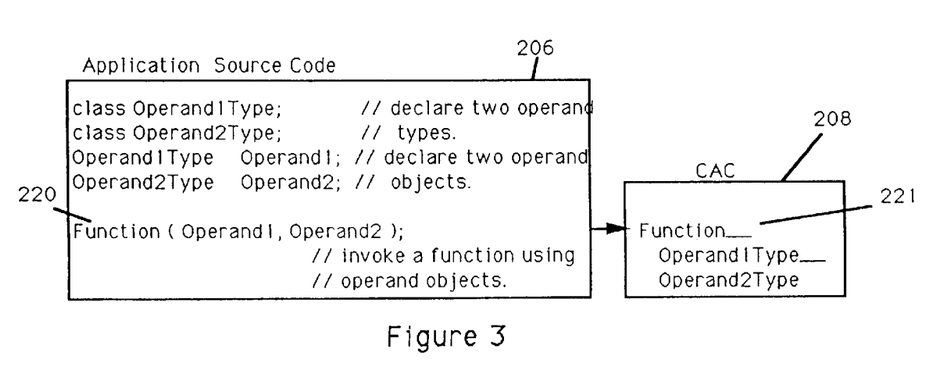
FIG. 3 is an illustration of the function or procedure name augmentation performed by the compiler.

Overloading allows a single named function to be used with a variety of calling parameters. Functions are independent processing operations represented by a name and an optional argument list. Functions are analogous to the methods defined for a class and similar to the procedures and functions declared in conventional software systems. The arguments (operands) of a function are specified in an argument list enclosed in parentheses following the function name. Each of the arguments have a data type associated with them. For example, one argument may be an declared as an integer while another argument is declared as a floating point number. Arguments may also be objects. The compiler performs the type checking necessary to ensure that argument data types used in the call to a function are the same data types used in the declaration of the function. The compiler in a strongly typed object oriented system may allow the same function name to be used with many different types of operands. This method of handling a variety of input data types is called overloading. Function name overloading allows multiple function instances to share a common name where a common operation is performed on different argument types. Overloading is commonly implemented in compilers by appending the name of the operand data types to the function name as shown in FIG. 3. The function call depicted uses two data parameters (Operand1 and Operand2) of a data type Operand1Type and Operand2Type, respectively. The compiler implements the call by replacing the data parameter names with their respective data type names (Operand1Type and Operand2Type) and appending the data type names to the function name. Thus, the example function call 220 in FIG. 3 prior to compilation:

Function (Operand1, Operand2);

is transformed by the compiler into the call 221:

Function_Operand1 Type_Operand2Type;

This function and procedure call augmentation is key to the implementation of overloading in the prior art.

Libraries

Software libraries are another feature available in the prior art. These libraries are independent software components, which can be separately compiled apart from the other software components using the classes defined within the library. A library consists of executable code and a directory (symbol table) of procedure entry points to the executable code within the library. Related class definitions are often grouped into libraries. The compiled version of the library components are called library object files (denoted herein as CLCs or Compiled Library Components in order to eliminate confusion between object files and the objects associated with instantiated classes). A separate CLC is created for each compiled library. The software components using a library can be denoted as application components. An application component may access the library by including a reference to the library name in the application component source code. This library reference is used later by a static linker in order to locate the library elements referenced in the application component source code. The application component is also an independently compilable element. The compiled version of the application component is called the CAC or Compiled Application Component.

Static Linking

The static linker is used to create an executable version of the software by combining the CAC with the CLCs and by resolving inter-component references. The static linker also creates a symbol table or index including all of the objects defined within the combined software system. The symbol table maps all of the object names and associated methods to their entry points in the library.

The static linker performs the task of combining software components together by scanning the code contained in the CAC and referenced CLCs line by line until the entire group of components have been processed. References to elements external to a component are resolved as the processing progresses. Once a library is included, the static linker will incorporate the code for each of the library objects into the executable code and the symbol table; each element does not necessarily need to be used (referenced) by the application component in order to be included. Some static linkers will strip out the objects not actually used by another software component. In this manner, the static linker resolves each of the library references made by the CAC or another CLC. The static linker produces an executable image of the combined program, which can be loaded into the computer system memory and executed by the processor.

The prior art static link scheme works well when the elements to be referenced by the CAC are known at compile or link time. The names of the derived classes of an abstract class may not be known, however until program execution time (run time). In this case, the prior art static linker is unable to assign a pointer to referenced objects and methods in the CAC executable code. This is a situation when dynamic (execution time) linking is necessary.

Dynamic Linking

A form of dynamic linking in a strongly data typed system exists in the prior art. One implementation of this form appears in a book *Inside OS/2*, written by Gordon Letwin, Microsoft Press, 1988, pp. 89–116. The OS/2 dynamic linking scheme provides an execution time method for an application program to explicitly request the operating system to load and run a program. As stated in the book, runtime dynamic linking in OS/2 is useful when a program knows that it will want to call some dynamically linked routine; but, it doesn't know which routine. The OS/2 implementation is a non-object oriented system. The benefits of object oriented data abstraction and inheritance are not available; moreover, the OS/2 dynamic linking scheme does not support the indirect access of object functions. In contrast, the present invention provides a way for an object oriented application program to dynamically link an object during program execution time. The dynamically linked object may be from a derived class, thus the object need not be explicitly named.

Other forms of dynamic linking exist in programming environments without strong data typing. Such systems, including Smalltalk and Lisp, provide a capability to incorporate new objects or functions into the existing application. However, these systems combine the application software itself with the program development tools (compiler and linker) into a single software component. A library query function or associated create object function as in the present invention is not necessary nor provided by these un-typed software systems. Further, the combined component of the un-typed system consumes a large portion of memory, requires a powerful processor, and cannot be easily divided into separately executable and marketable portions. For these reasons, the untyped programming environments are unable to effectively compete with the strongly-typed systems such as C++.

Thus, a new scheme for the dynamic linking and loading of object oriented software components in the strongly-typed category is required. The present invention provides this new scheme in the form of a dynamic linking apparatus and method for linking software components during program execution.

SUMMARY OF THE INVENTION

An apparatus and method for the dynamic linking of object oriented software components is disclosed. The present invention comprises a computer system including a bus for interconnecting system components, a processor, a random access memory, and a data storage means for storing data. The present embodiment also includes a set of at least two software components. This invention provides a method and means for dynamically linking object oriented software components during run time execution of the program.

The present invention includes two main features. First, a query function is provided to allow an application component to determine, during program execution time, the name and location of library classes available for use. Second, the application component can create (instantiate) instances of derived classes of an abstract base class. The application component can manipulate the instantiated object using the abstract interface provided by the base class definition.

The implementation of the present invention involves processing at two steps in the software generation cycle. First, the prior art static linker must be modified to provide processing support for the present invention at link time. Second, the main features of the present invention are performed at application program execution time.

DETAILED DESCRIPTION OF THE INVENTION

An apparatus and method for the dynamic linking of object oriented software components is disclosed. The present invention relates to computer systems where the controlling program logic is divisible into at least two separately generated portions. At least one interface between the components must exist. The present invention provides a means and method for dynamically linking object oriented software components during program execution time. The following detailed description describes dynamic linking as a means for combining software components in this manner.

Figure 1:
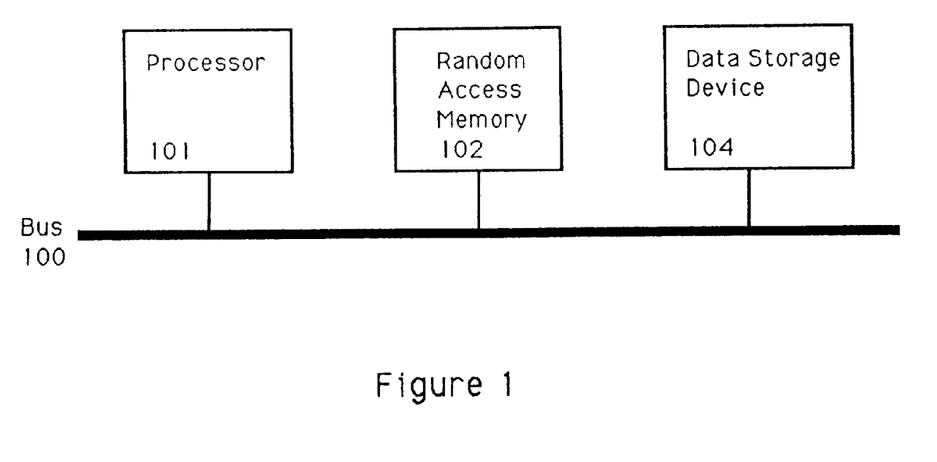
FIG. 1 is an illustration of the computer system architecture which may be used with the present invention.

The preferred embodiment of the present invention is implemented on an Apple Macintosh™ computer system, manufactured by Apple Computer, Inc. of Cupertino, Calif. It will be apparent to one of ordinary skill in the art upon reference to this invention, however, that alternative systems may be employed. In general, such systems as illustrated by FIG. 1 comprise at least a bus 100 for communicating information, a processor 101 coupled with said bus for processing information, a random access memory 102 coupled with said bus 100 for storing information and instructions for said processor 101, and a data storage device 104 such as a magnetic disk and disk drive coupled with said bus 100 for storing information and instructions.

The dynamic linking method and apparatus of the present invention provide additional capabilities for these computer systems. The features of the present invention are described below. The general methods of program generation and software design are described only where necessary to provide a thorough understanding of the present invention since these methods are known to those of ordinary skill in the computer art.

Operation of the Present Invention

The dynamic linking system of the present invention is comprised of a set of software functions and processes which augment the prior art method of program design, generation, and operation. Dynamic linking of object oriented software components in the preferred embodiment provides two main features. First, a query function is provided to allow an application component to determine, during program execution time, the name and location of library classes available for use. Second, the application component can create (instantiate) instances of derived classes of an abstract base class. The application component can manipulate the instantiated object using the abstract interface provided by the base class definition. Both of these three features of dynamic linking will be described in the following sections.

Figure 4:
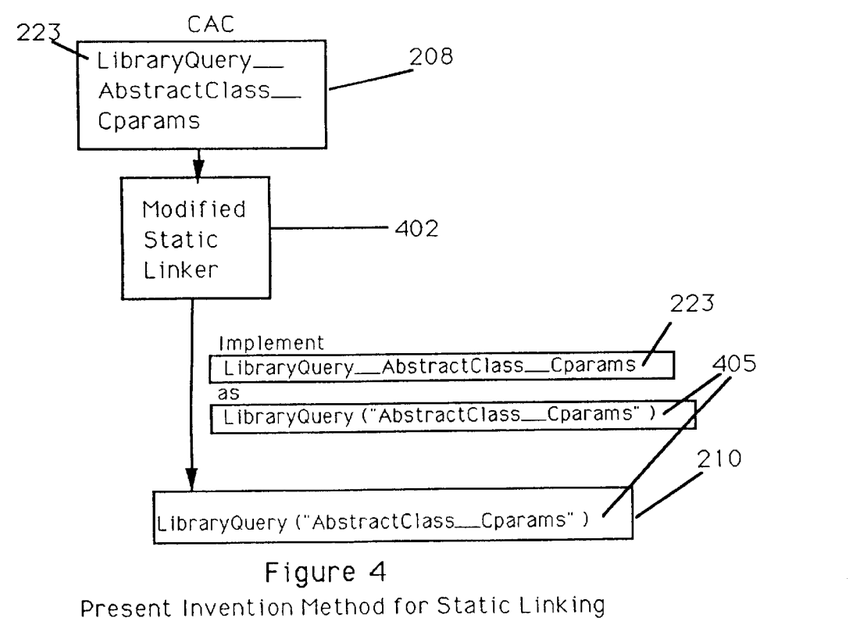
FIG. 4 is an illustration of the static link processing performed for a call to the LibraryQuery function.
Figure 5:
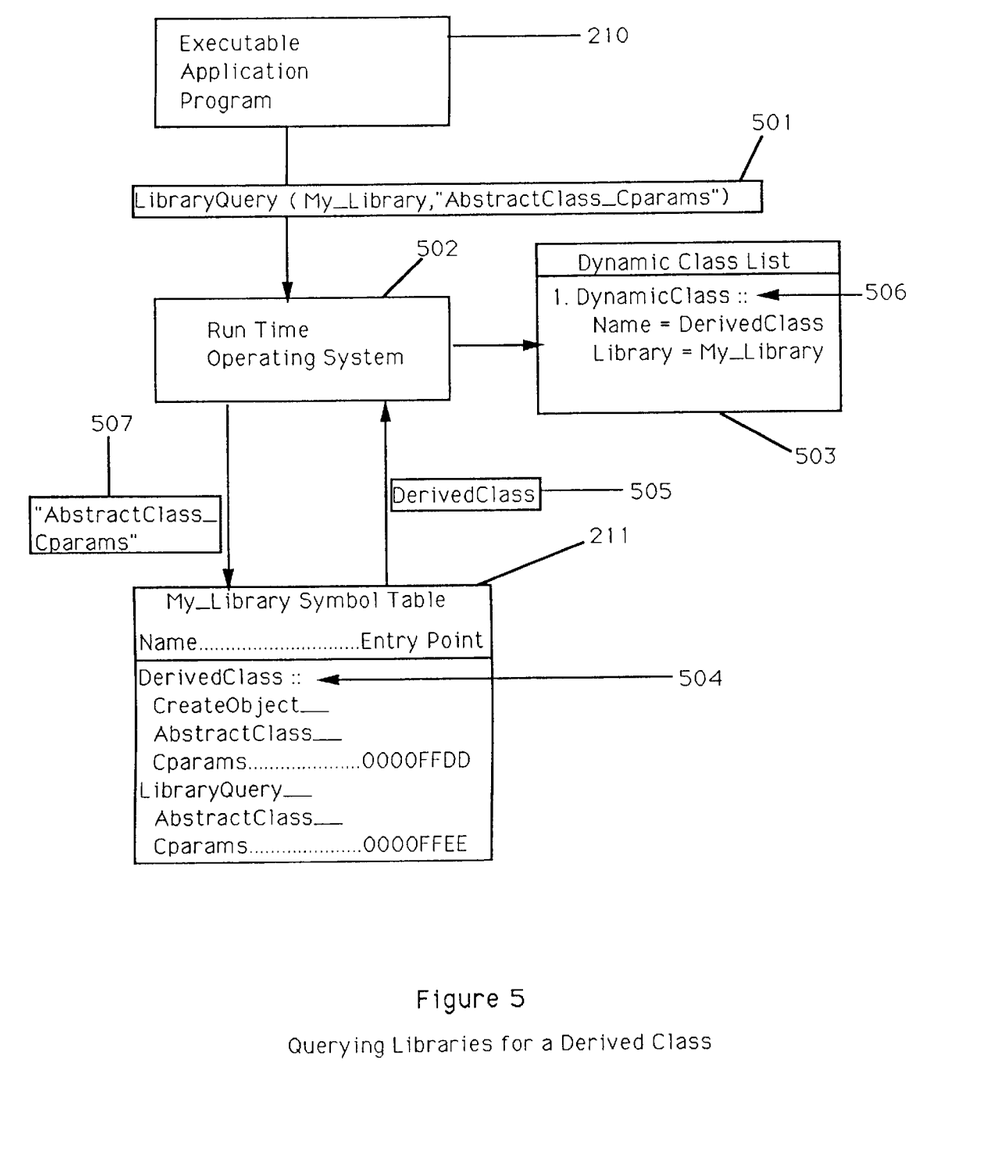
FIG. 5 is an illustration of the execution time processing performed for a call to the LibraryQuery function.

Dynamic linking in the present embodiment provides a Library Query capability. This query function is used to determine, at program execution time, the names of derived classes defined in a currently accessible software library that match a specified abstract base class type and optional constructor parameters. The Library Query feature is implemented in two steps: the first step occurs during program static link time; the second step occurs during program execution time. The static link time step is necessary in order to provide for the proper linking of a CAC call to the Library Query function with the proper input data. The execution time step is necessary in order to perform the run time query. FIG. 4 depicts the processing implementation of the Library Query feature during static link time. FIG. 5 depicts the run time features of Library Query.

Figure 3A:
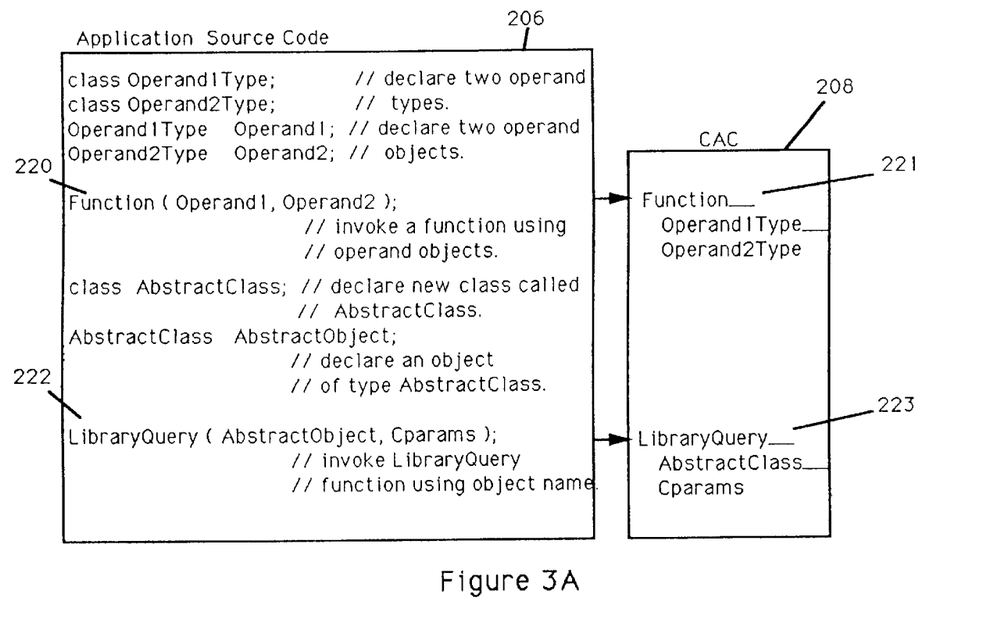
FIG. 3A is an illustration of the LibraryQuery function name augmentation performed by the compiler.

The static link time implementation of the Library Query feature, illustrated in FIG. 4, is a necessary part of the processing performed by the present invention. As shown in FIG. 3A, a Library Query function call 222 has been added to the application source code 206. This call is transformed by the compiler 202 into the compiled code 223 in the same manner as the function call 220 was transformed into the compiled code 221 as described above and shown in FIGS. 3 and 3A. The modified static linker 402, shown in FIG. 4, is also different from the prior art. The modified static linker 402 includes a modification necessary in the present invention to process the compiled composite call 223 of the Library Query function. The processing performed by the present invention for the compiled Library Query call 223 is discussed next.

Referring again to FIG. 4, the CAC 208 contains a call to the LibraryQuery function 223. The purpose of this function call 223 is to determine the names of all of the derived classes for the specified abstract base class (AbstractClass) contained in any included library. The LibraryQuery function may also search for derived classes of a specified abstract base class in a particular specified library. The arguments to the LibraryQuery function include abstract base class, optional constructor parameters, and optional library to search. One notable feature of this call 223 is that the name of the abstract base class is the only class specification necessary; no derived class specification is required. For example, the application may need to know the types of shapes available from the library. The abstract class "SHAPE" would be passed in a call to LibraryQuery. LibraryQuery would in turn provide a list of derived classes (eg. square, circle) derived from the abstract class SHAPE. The optional constructor parameters allow the application to include other interface parameters that may be needed to distinctly instantiate an abstract class. Using the constructor parameters, the LibraryQuery call may be conveniently overloaded.

Each line of CAC 208 code is scanned by the modified Static Linker 402. Most lines of CAC 208 code do not require any special processing for the implementation of Library Query. These unmodified lines of compiled code are processed normally by the modified Static Linker 402. Calls to LibraryQuery 223 are specially handled by the modified Static Linker 402. This special processing is triggered by the name of the LibraryQuery function. The actual name of the Library Query function can be different in other embodiments as long as the name is used consistently across all software components.

The special processing performed by the modified Static Linker 402 for a call to the LibraryQuery function is required to create an implementation of the call with the specified combination of abstract class and constructor parameters. The compiler 202 generates a call to a composite LibraryQuery function 223 with the argument data types included as part of the call in a composite form. Special processing by the modified static linker 402 is required to convert the composite function call 223 generated by the compiler 202 to a LibraryQuery function call 405 with the names of the arguments passed as alphanumeric strings. This is done by creating an implementation (function code body) for the composite function 223 which simply calls the standard LibraryQuery function with the argument types passed as strings. The composite function call 223 is incorporated into the executable application program 210 as any other function call is normally processed. The application call 222 to the LibraryQuery function is thus mapped to the composite function call 223 which in turn calls the LibraryQuery function 405 with the input argument string. In this manner, the LibraryQuery function receives control during CAC 208 program execution with the appropriate input. The run time processing of LibraryQuery is described next.

As shown in FIG. 5, a Run Time Operating system 502 contains the executable code for the Library Query function itself. A library component contains the declarations for abstract base and derived classes. The names and locations of the library component or library components is known to the Run Time Operating system 502. The static linker modification provides the processing necessary for the proper activation of the Library Query function with the required input parameters.

After the CAC 208 is static linked using the method described above, the executable application component 210 can be loaded into computer memory 102 and executed by the processor 101 using techniques known in the computer art. The LibraryQuery function executable code, residing in the Run Time Operating System 502 component, is executed when processing proceeds to the point of the LibraryQuery call 223 in the CAC 208 described above. This call 223 may be made by the application component 208 anytime during the course of the application's execution. The LibraryQuery call 223 may be made more than once. When LibraryQuery is executed, the process of searching software libraries 205 for the specified derived classes is initiated as depicted in FIG. 5.

The arguments passed in the LibraryQuery function call 501 include the alphanumeric argument string containing the abstract base class name and the optional constructor parameters along with the name of the specific library to search (optional argument). The library name is used to limit the query to classes found in a particular library. Using the argument string and library name, the LibraryQuery function searches the library Symbol Table 211 for an occurrence of the argument string in a derived class method declaration of CreateObject as shown in the example given in FIG. 5. The library Symbol Table entry 504 for the CreateObject method is created when the library is compiled and linked as depicted in FIG. 2. Since the arguments passed to the CreateObject method are the same as those in the LibraryQuery call 405 argument string, the LibraryQuery function is able to search the library symbol table 211 for a declaration of a derived class method called CreateObject 504 with the same argument list as present in the argument string passed to LibraryQuery 405. When a match is found, the name of the derived class 505 can be copied from the CreateObject declaration 504. The occurrence of this declaration 504 is guaranteed to occur only once for a given derived class with the given constuctor parameter list. For a given abstract base class, more than one derived class 505 can meet the search criteria; thus, a list of classes (Dynamic Class List) 503 derived from a specified base can be generated. If the library symbol table 211 is searched without a match, the list of classes returned by LibraryQuery is a null or empty value.

For each derived class 505 found by LibraryQuery, an entry in the Dynamic Class List 503 is created. Each entry in the Dynamic Class List 503 is a DynamicClass data type 506. A DynamicClass data type 506 is comprised of at least the following data items for each derived class found: name of the derived class and the name of the library in which the derived class was found. Other data items and methods may also be provided for a DynamicClass data type 506. Methods may be provided to query an object declared as a DynamicClass data type 506 in order to determine the object's structure or status. Another embodiment may also retain a pointer to the method for instantiating an object of the derived class 505 type. The Dynamic Class List 503 is used by the executable application component 210 for instantiating objects of the derived class 505 type and for manipulating instantiated objects.

Figure 6:
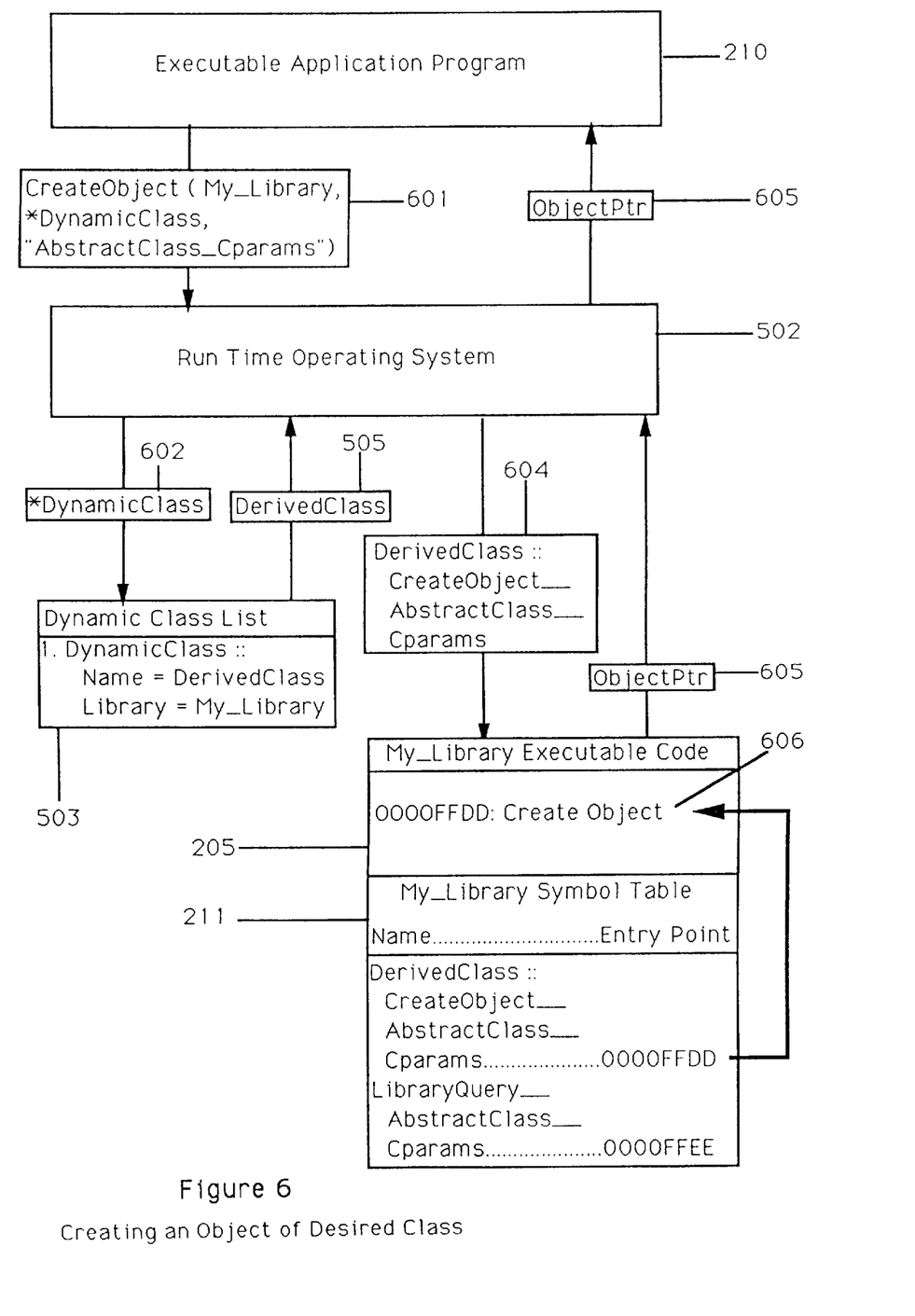
FIG. 6 is an illustration of the execution time processing performed for a call to the CreateObject function.

The second feature provided by the present invention is the Create Object feature. Objects of a derived class type are instantiated (created) using this feature as depicted in FIG. 6. During run time execution of the executable application component 210, a call to CreateObject 601 is executed as illustrated in FIG. 6. The CreateObject call 601 is included in the application component's source code 206, compiled, and static linked into the executable application component 210 in the same manner as any function call is compiled and static linked in the prior art. The input parameters for this call 601:

(Library, *DynamicClass and AbstractClass_CParams) are used by CreateObject to activate the appropriate derived class method for instantiating an object of the type specified by the DynamicClass derived class name 505. This derived class name 505 was located by the LibraryQuery function.

The appropriate derived class method is determined by using the DynamicClass object pointer 602 passed as input 601 to the CreateObject function. This pointer 602 is used to access the Dynamic Class List 503 in order to retrieve the derived class name 505 associated with the Dynamic Class pointer 602. This derived class name 505 is then used to generate the CreateObject method name 604 associated with the derived class name 505 and the abstract class and constructor parameters specified in the call to CreateObject 601. The derived class CreateObject method name 604 is used to search the library symbol table 211 for the location of the derived class CreateObject method 606 in the desired library.

If a derived class method for creating the object does not exist, an error is returned to the executable application component 210. If the proper derived class method 606 is located, the method is activated by transferring processor control to the method 606. Once activated, the method 606 instantiates an object of the derived class type 505 using a function (New) commonly provided by most object oriented systems. The derived instantiation method 606 returns a pointer 605 to the object (ObjectPtr) for use in accessing data or methods comprising the instantiated object. This pointer 605 is returned to the executable application component 210 with a data type assigned to the type of the abstract class passed as input 601 to CreateObject. The processing for CreateObject then terminates normally.

Once the object has been dynamically instantiated, the object can be manipulated using standard facilities provided by any object oriented language. Many prior art techniques exist for manipulating instantiated objects. The run time manipulation of the instantiated derived object can be achieved without use of the derived class name 505. Further, the instantiated object is not specially designated as a dynamically created object. The application component can manipulate the dynamically created object just as any other object created without the use of dynamic linking.

Processing Logic for the Present Invention

The present invention includes computer program logic for the operation of the library query function (LibraryQuery) and the object instantiation function (CreateObject). This logic, executed by the processor 101, is described in the following section and in FIGS. 7 and 8. The run time processing performed by the present invention relies upon the availability of an operating system residing in the random access memory 102 and executed by the processor 101. The operating system performs the low-level initialization of the computer system hardware components, handles the loading of the executable code containing the linked application component and library components into random access memory for access by the processor, and controls the run time execution of the computer system. The operating system and the computer system hardware components are standard processing components known in the computer art.

When the computer system hardware components of the present invention are first powered up, operating system logic takes control and initializes other system hardware components such as random access memory 102 and the data storage device 104. At the end of its initialization cycle, the operating system initiates the processor instructions residing in the executable application component 210. As described above, the executable application component 210 may contain a call to the LibraryQuery function 501, and/or a call to the CreateObject function 601, and/or an abstract access to a derived object 701. When the LibraryQuery function call 501 is executed, the processing flow depicted in FIG. 7 and described below is initiated. When the CreateObject function call 601 is executed, the processing flow depicted in FIG. 8 and described below is initiated. Other means for activating the application component program logic are available.

Figure 7:
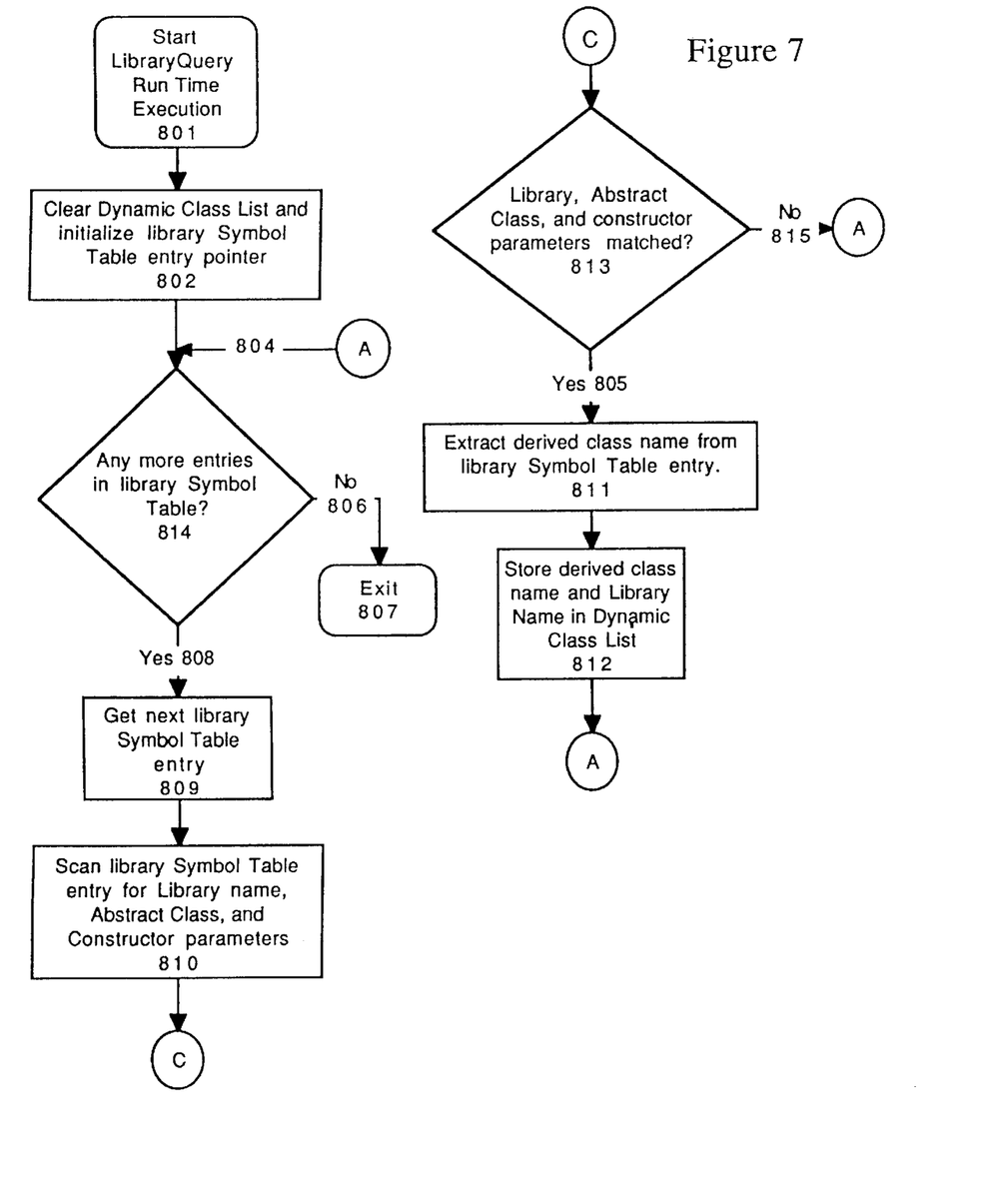
FIG. 7 is a flowchart of the execution time processing performed by the LibraryQuery function.

Once the LibraryQuery logic is activated, the processing flow begins as shown in FIG. 7 at the box labeled "Start LibraryQuery Run Time Execution" 801. First, the Dynamic Class List is initialized 802. Each entry in the List is set to a null or empty value. An index into the library symbol table is initialized to the top of the library symbol table. Next, a loop is initiated 814 (at A) which scans each entry in the library symbol table. When the entire library symbol table has been read 806, the LibraryQuery function terminates 807. For each entry found in the library symbol table 808, the Library name (if specified), the Abstract Class name, and the Constructor parameters are parsed from the symbol name 809. These data items are compared 813 to the parameters supplied to the LibraryQuery function on the initial call 501. If the parameters match 805, a derived class has been declared using the specified abstract class as a base class. In this case 805, the derived class name is stripped or copied from the library symbol table entry 811 and stored with the Library name in the next available position in the Dynamic Class List 812 (also shown as 503 in FIG. 5). Program execution is transferred to the top of the loop starting at A. If the parameters do not match 815, execution is transferred directly to A and the loop begins again for a new library symbol table entry 804. Processing continues until the library symbol table is completely read 806.

Figure 8:
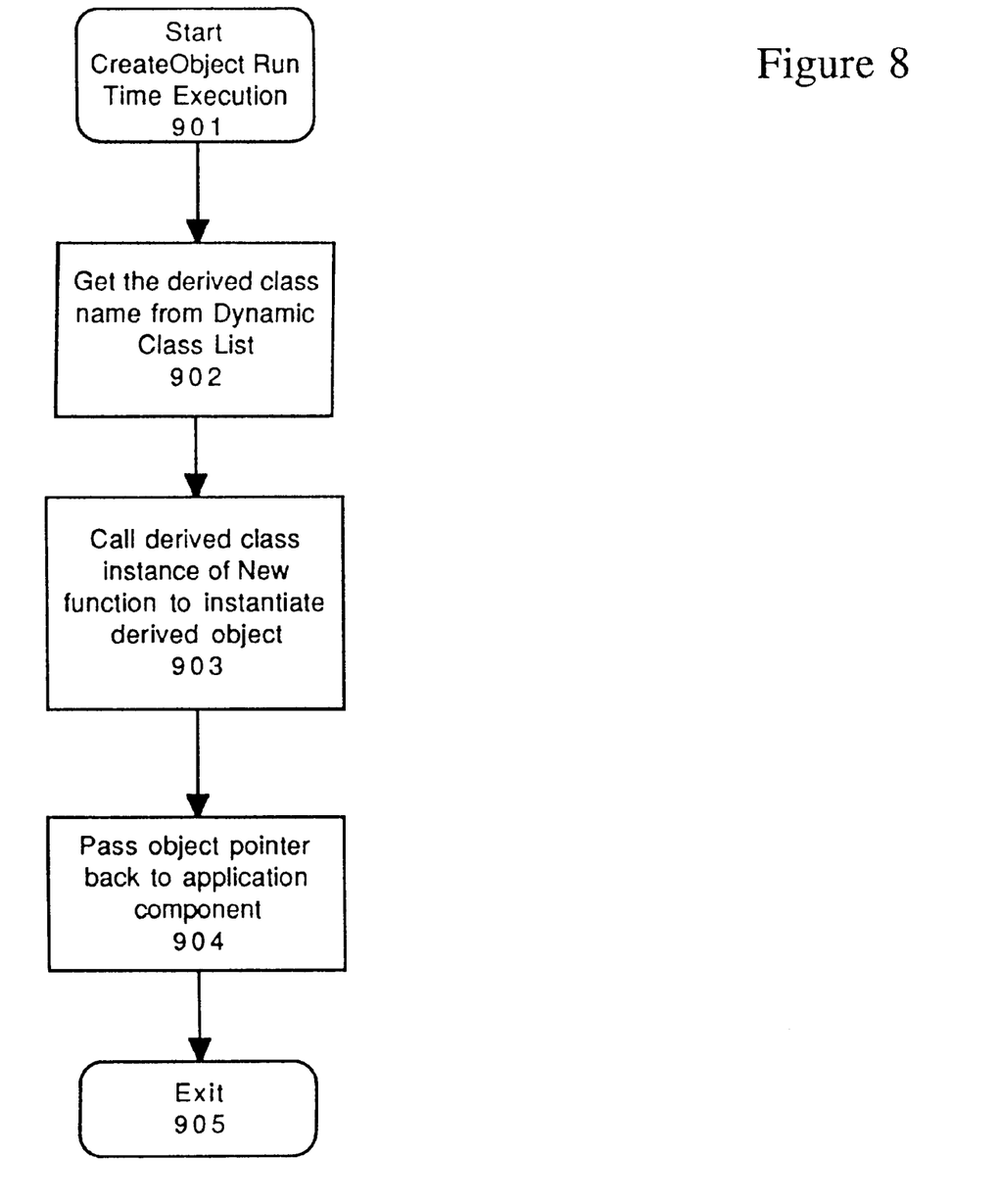
FIG. 8 is a flowchart of the execution time processing performed by the CreateObject function.

When a call to the CreateObject function 601 is executed by the Run Time Operating System 502, the processing flow begins as shown in FIG. 8 at the box labeled "Start CreateObject Run Time Execution" 901. First, at the processing box 902, the derived class name 505 is retrieved from the Dynamic Class List 503 at the location specified by an input parameter 602. Next, at processing box 903, this derived class name 505 is used to call the derived class instance 604 of the "New" function. The New function is a well known and commonly used object oriented function provided by existing object oriented programming languages for the purpose of instantiating an object from a specified class. The return parameter from the New function is a pointer 605 to the newly created object. This object pointer 605 is passed back to the application component 210 in processing box 904. The processing for the CreateObject function terminates normally at box 905. If for some reason, the object can not be created, a null pointer is returned.

Although this invention has been shown in relation to a particular embodiment, it should not be considered so limited. The concepts and methods of the present invention are applicable to other similar embodiments related to the idea of dynamic linking of software components. Rather, this invention is limited only by the appended claims.

What is claimed is:

1. In a computer system having a processor, a data storage means coupled to said processor, and a plurality of software components coupled to said processor, said plurality of software components containing processor instructions executed by said processor during run time execution, a process for dynamically linking said plurality of software components during run time execution, said process comprising the steps of:

querying said plurality of software components for the identity of derived classes associated with an explicitly named abstract base class, said derived classes declared in one of said plurality of software components;

instantiating an instance associated with one of said derived classes without explicitly naming said derived class.

2. The process of claim 1 wherein said step of querying said plurality of software components comprising:

modifying one of said plurality of software components during static link time for the purpose of redirecting the execution of said processor instructions to one of said software components containing a standard library query function;

executing said standard library query function during run time execution.

3. The process of claim 1 wherein said step of instantiating said instance comprising:

locating a derived class instantiation function contained in one of said plurality of software components, said derived class instantiation function associated with one of said derived classes;

executing said derived class instantiation function during run time.

4. The process of claim 2 wherein said step of modifying one of said plurality of software components during static link time comprising:

modifying a static linker program that performs a static link so that said static linker recognizes an invocation of a library query function with function interface parameters;

modifying said invocation of a library query function so that said standard library query function is executed with said function interface parameters converted to a form compatible with data stored in a library symbol table.

5. The process of claim 2 wherein said step of executing said standard library query function during run time execution comprising:

searching said library symbol table for an occurrence of said function interface parameters combined with a derived class instantiation function;

extracting the derived class name from said derived class instantiation function located in said library symbol table;

storing said derived class name into a dynamic class list.

6. The process of claim 3 wherein said step of locating a derived class instantiation function comprising:

accessing said dynamic class list to determine said derived class name associated with said derived class instantiation function;

searching said library symbol table for an occurrence of said derived class name in association with said derived class instantiation function;

extracting a function entry point associated with said derived class instantiation function;

transferring processor control to said derived class instantiation function.

7. The process of claim 3 wherein said step of executing said derived class instantiation function during run time includes producing a pointer to an instance of said derived class instantiated by said derived class instantiation function.

8. The process of claim 7 wherein said pointer to an instance of said derived class and said instance of said derived class cannot be identified as having been instantiated using said step of instantiating said instance.

9. A computer system having a processor, a data storage means coupled to said processor, and a plurality of software components coupled to said processor, said plurality of software components containing processor instructions executed by said processor during run time execution, said computer system including means for dynamically linking said plurality of software components during run time execution, said means for dynamically linking comprising:

means for querying said plurality of software components for the identity of derived classes associated with an explicitly named abstract base class, said derived classes declared in one of said plurality of software components;

means for instantiating an instance associated with one of said derived classes without explicitly naming said derived class.

10. The means for dynamic linking in claim 9 wherein said means for querying said plurality of software components comprising:

means for modifying one of said plurality of software components during static link time for the purpose of redirecting the execution of said processor instructions to one of said software components containing a standard library query function;

means for executing said standard library query function during run time execution.

11. The means for dynamic linking in claim 9 wherein said means for instantiating said instance comprising:

means for locating a derived class instantiation function contained in one of said plurality of software components, said derived class instantiation function associated with one of said derived classes;

means for executing said derived class instantiation function during run time.

12. The means for dynamic linking in claim 10 wherein said means for modifying one of said plurality of software components during static link time comprising:

means for modifying a static linker program that performs a static link so that said static linker recognizes an invocation of a library query function with function interface parameters;

means for modifying said invocation of a library query function so that said standard library query function is executed with said function interface parameters converted to a form compatible with data stored in a library symbol table.

13. The means for dynamic linking in claim 10 wherein said means for executing said standard library query function during run time execution comprising:

means for searching said library symbol table for an occurrence of said function interface parameters combined with a derived class instantiation function;

means for extracting the derived class name from said derived class instantiation function located in said library symbol table;

means for storing said derived class name into a dynamic class list.

14. The means for dynamic linking in claim 11 wherein said means for locating a derived class instantiation function comprising:

means for accessing said dynamic class list to determine said derived class name associated with said derived class instantiation function;

means for searching said library symbol table for an occurrence of said derived class name in association with said derived class instantiation function;

extracting a function entry point associated with said derived class instantiation function;

transferring processor control to said derived class instantiation function.

15. The means for dynamic linking in claim 11 wherein said means for executing said derived class instantiation function during run time includes producing a pointer to an instance of said derived class instantiated by said derived class instantiation function.

16. The process of claim 15 wherein said pointer to an instance of said derived class and said instance of said derived class cannot be identified as having been instantiated using said step of instantiating said instance.

* * * * *